United States Patent [19]
Slater, Jr.

[11] 3,923,325
[45] Dec. 2, 1975

[54] COMPRESSION COUPLING
[75] Inventor: Charles A. Slater, Jr., Leawood, Kans.
[73] Assignee: Peterson Manufacturing Company, Grandview, Mo.
[22] Filed: Oct. 17, 1974
[21] Appl. No.: 515,687

[52] U.S. Cl. .............. 285/312; 137/223; 137/322; 285/346; 285/423
[51] Int. Cl.² .......................................... F16L 37/18
[58] Field of Search .......... 285/312, 320, 346, 423, 285/DIG. 22; 137/223, 322

[56] References Cited
UNITED STATES PATENTS
| | | | |
|---|---|---|---|
| 1,784,822 | 12/1930 | Crowley | 285/312 X |
| 3,133,777 | 5/1964 | Anhalt | 285/DIG. 22 |
| 3,738,688 | 6/1973 | Racine | 285/346 |

FOREIGN PATENTS OR APPLICATIONS
| | | | |
|---|---|---|---|
| 345,746 | 4/1931 | United Kingdom | 285/346 |
| 619,303 | 3/1949 | United Kingdom | 285/346 |
| 292,362 | 6/1928 | United Kingdom | 285/346 |
| 318,660 | 9/1929 | United Kingdom | 285/346 |
| 295,389 | 4/1965 | Netherlands | 285/DIG. 22 |

Primary Examiner—Thomas F. Callaghan
Attorney, Agent, or Firm—Fishburn, Gold & Litman

[57] ABSTRACT

A compression coupling for use on air hoses to sealingly engage elongate tubular receiving members such as pneumatic tire stems and providing for depressing and opening a valve therein for air passage as in inflating a tire. The coupling parts are molded of synthetic resin and are a body, a hose connector and depressor member and a lock lever. The hose connector and depressor member and a resilient compression seal collar are slidable in the body and the lock lever with trunnions is snapped into the body holding the parts in assembled relation and swingable between a collar compressing position for engagement with a stem and a stem release position.

2 Claims, 4 Drawing Figures

COMPRESSION COUPLING

This invention relates to compression couplings and more particularly to hose connectors that are operable to provide an air tight connection from an air hose to a threaded valve stem without screwing the connector thereon.

The principal objects of the present invention are: to provide a quick acting compression coupling of non-metallic parts that may be manufactured by molding; to provide such a coupling for connecting an air hose and the tire stem with parts to depress the valve in the stem when the coupling is sealingly engaged with the stem; to provide such a coupling having a structure that permits a compressable seal collar, hose connector and collar compressor and operating lever to be moved into a body in that sequence and force applied to the lever to move lever trunnions into bearing openings in the body and thereby hold all of the parts in assembled relation; to provide such a coupling that may be quickly and easily assembled without tools; to provide such a coupling with lever trunnions and cooperating body wall portions having limited resiliency that permits spreading for movement of the trunnions into alignment with bearing cavities with the wall portions returning to normal position with the trunnions retained in the bearing cavities; to provide such a coupling wherein the lever member has eccentric portions engaging the collar compressor to move same between collar compressing and collar releasing positions; to provide such a coupling wherein the lever member eccentric portions and collar compressor have cooperating parts which engage at the ends of the lever movement to retain same in the respective position until forceably removed therefrom; to provide such a coupling that is economical to manufacture, capable of long operating life and particularly well adapted for its proposed use.

Other objects and advantages of this invention will become apparent from the following description taken in connection with the accompanying drawings wherein are set forth by way of illustration and example certain embodiments of this invention.

The drawings constitute a part of this specification and include exemplary embodiments of the present invention and illustrate various objects and features of the apparatus.

Figure 1:
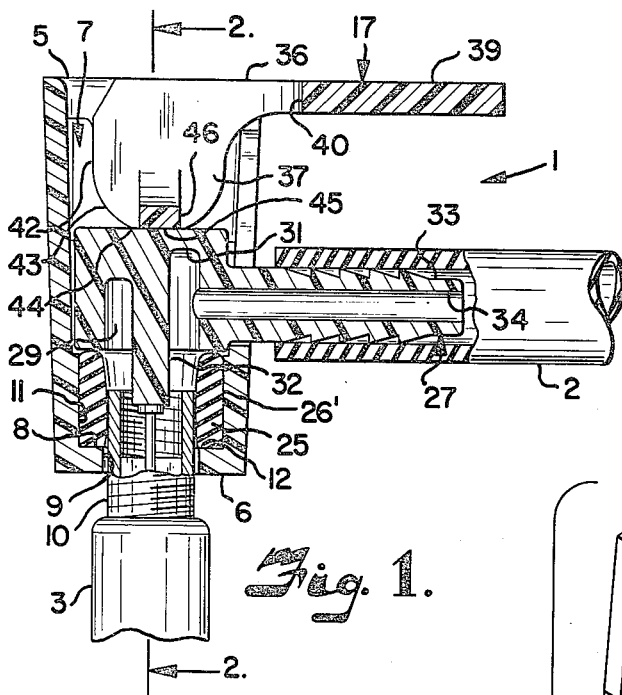
FIG. 1 is a side elevation of the coupling on an air hose connected to a tire stem with portions broken away to show the compression engagement with the stem.
Figure 2:
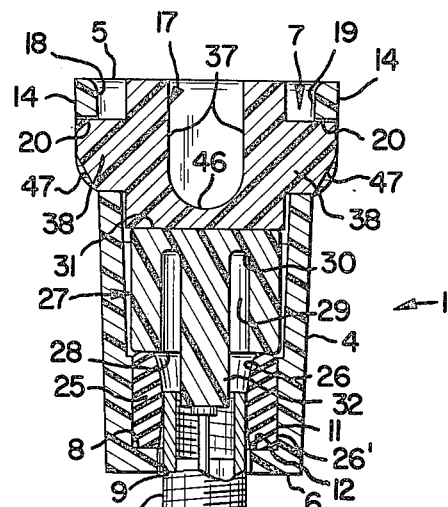
FIG. 2 is a longitudinal sectional view through the compression coupling taken on the line 2—2 FIG. 1.
Figure 3:
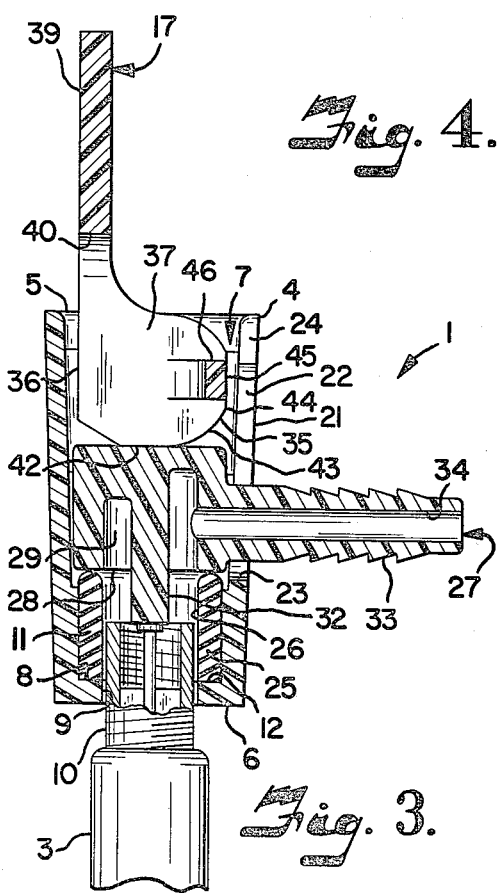
FIG. 3 is a longitudinal sectional view through the compression coupling with the parts in released position.
Figure 4:
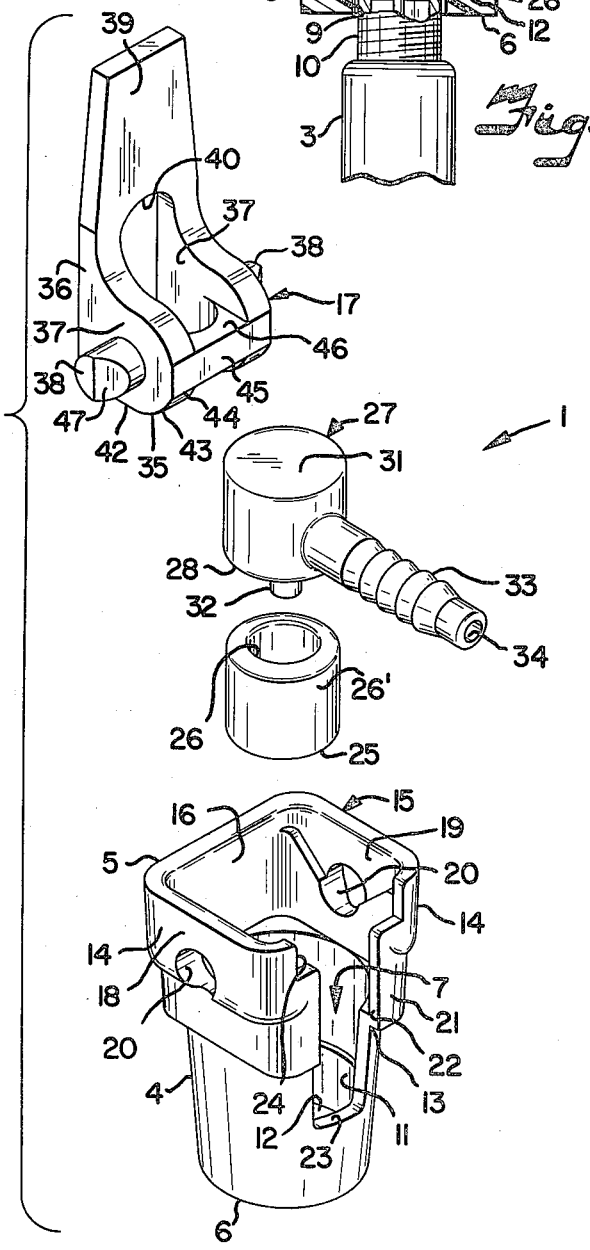
FIG. 4 is a disassembled perspective view of the compression coupling parts.

Referring more in detail to the drawings

As required, detailed embodiments of the present invention are disclosed herewith, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a compression coupling for connecting a cource of air such as a hose 2 to an elongate tubular receiving member 3 which in the illustrated structure is a stem of a pneumatic tire. The coupling includes a body member 4 having opposed ends 5 and 6 with an enlarged bore or cavity 7 opening from the end 5 and extending toward the end 6, said bore terminating at a bore end 8 spaced from the end 6 of the body member. An opening 9 smaller than the bore 7 extends from the end 6 of the body and communicates with the bore 7, said opening 9 being coaxial with the bore 7 and of a size to permit an end portion 10 of a tire stem 3 to extend into the bore 7.

In the structure illustrated, the bore 7 has a generally cylindrical portion 11 adjacent the body end 6, said cylindrical bore portion cooperating with the opening 9 to define an annular shoulder 12 at the bore end 8. The exterior of the body member 4 has a generally cylindrical portion extending from the end 6 and terminating as at 13 with the exterior shape generally rectangular with rounded corners and with a further enlarged laterally extending portions 14 adjacent the end 5. This arrangement provides side walls 15 which define a generally rectangular portion 16 of the bore 7 to receive a lever member 17 as later described. In the structure illustrated the rectangular portion of the body has opposed side walls 18 and 19 with aligned bearing cavities or openings 20 to mount the lever member 17 as later described. Another wall 21 of the body member has a slot extending from the end 5 and terminating in an end 23 adjacent to the cylindrical portion 11 of the bore 7. The slot 22 has a portion 24 of greater width adjacent the end 5, said greater width portion being substantially the width of the rectangular bore portion 16.

A compression collar, sleeve or bumper 25 preferably formed of suitable resilient material such as rubber, neoprene or the like is generally cylindrical with an axial bore 26. The collar or sleeve 25 has an exterior diameter and shape to be positioned in the cylindrical portion 11 of the bore 7 with the outer surface 26' of the collar engaging the inner surface of the bore. In the structure illustrated, the collar engages the shoulder 12 and has a normal length whereby it extends from the shoulder to slightly beyond the end 23 of the slot 22. The bore 26 is of a size to move over the threads of a tire stem end portion 10 and permit the collar to resiliently and sealingly engage the stem at the end portion in response to longitudinal compression of the collar member as later described.

A collar depressor 27 is slidably mounted in the bore 7 and has an end 28 adapted to engage the collar 25. The depressor portion in the bore 7 of the body member is generally cylindrical and has an axial cavity 29 extending inwardly from the end 28 and terminating as at 30 providing an end wall 31. An elongate stem or projection 32 extends from the end wall 31 axially of the cavity 29 and beyond the end 28 whereby said projection or stem is adapted to extend into the tubular stem member 3 to depress a valve therein as later described. The depressor member 27 also is provided for connection with the hose 2. In the structure illustrated, a tubular connector or nipple 33 extends outwardly through the slot 22 and preferably has serrations on its exterior to facilitate engagement and holding of a hose sleeved thereover. The nipple has a bore or passage 34 extending longitudinally therethrough to provide communication from the hose to the cavity 29 in the depressor member. It is preferred that the bore 7 in the area in which the depressor is positioned be slightly larger in diameter than the bore portion 11 to provide for clearance and free movement of the depressor member. Also the end 23 of the slot 22 and the nipple 33 are arranged relative to the end 28 that engages the collar whereby when the depressor member is moved to depress the collar and compress same into sealing engagement with a stem 3 there will be clearance between the nipple and the slot end 23.

The lever member 17 is suitably mounted in the enlarged cavity portion 16 of the body for pivotal movement to cause an eccentric or cam portion 35 to engage the end wall 31 of the depressor member and move the depressor member from coupling connecting position to coupling released position. In the structure illustrated, the lever has a head 36 with opposed flat sides 37 providing a width slightly less than the width of the wide portion 24 of the slot 22. The head 37 has laterally outwardly extended axially aligned bearing members or trunnions 38 adapted to be rotatably mounted or received in the bearing openings or cavities 20 in the body member. Extending from the lever member head 36 and spaced to one side of the axis is a handle 39. In the structure illustrated, the head and a portion of the handle are cut away as at 40 providing a bifurcated structure that is strong, but requires a minimum of material. The head has portions extending to the side of the axis of the trunnions oppositely from the handle that form eccentrics or cam portions 35 provided with a flat surface 42 at the low point and with the surface 43 extending in a curve outwardly at a progressively greater radius to a high point 44. The cam portion also has a flat surface 45 substantially at right angles to the flat portion 42 to provide lever retaining portions as later described. The eccentric portions of the lever head are connected by a bar 46 at the position of the flat portions 45. The outer ends of the trunnion 38 have the lower half bevelled or inclined downwardly and inwardly toward the flat portion 45 to provide inclined surfaces 47.

In the structure illustrated, the bearing openings 20 in the body walls 18 and 19 extend through said wall and the outer ends of the trunnions have a spacing whereby when the lever member 17 is mounted in the body, the trunnions 38 extend slightly beyond the outer surfaces of said side walls 18 and 19. The body member and the side walls 18 and 19 have limited resiliency and thickness to cooperate with the lever and trunnions thereon, whereby the side walls 18 and 19 will spread and permit the trunnions to be snapped therein. In the structure illustrated, the thickness of the side walls, together with the slot 22 in the body provides sufficient resiliency and the inclined portions or surfaces 47 on the ends of the trunnions 38 aid in spreading the side walls so that the lever members can be snapped into position to complete the assembly.

The body member 4, depressor member 27 and lever member 17 may be made of any suitable material, however, it is preferred that they each be integral structures, capable of being molded of suitable synthetic resin, such as nylon, polycarbonate and the like.

The parts are easily assembled, the compression collar or bumper is moved into the body bore 7 and positioned in the cylindrical portion 11 thereof with one end engaging the shoulder 12. A depressor member 27 is then aligned with the bore 7 with the nipple 33 aligned with the slot 22 and the projecting portion 32 extending toward the collar 25. The depressor member is then moved downwardly until the end 28 engages the collar. The lever member is then moved whereby the handle is generally parallel with the nipple and the inclined surfaces 47 engage the inner upper edges of the opposed side walls 18 and 19. This positions the bar 46 toward the end wall 31 of the depressor member. The body member is then held and force applied to the lever head to force same into the cavity 16, the inclined surfaces 47 causing the side walls 18 and 19 to spread sufficiently for the trunnions to move therebetween to a position of alignment with the bearing opening 20 and then the side walls return to normal position with the trunnions extending outwardly therein to rotatably mount the lever member 17 in the body 4. This engagement of the trunnions in the side walls 18 and 19 retains the parts in assembled position. In the structure illustrated, the lever is swung to a position wherein it extends outwardly from the end 5 or generally perpendicular to the nipple 37. In this position the flat portion 42 of the cam of the lever member engages the end wall 31 of the depressor member in the released position that permits the collar to expand, opening the bore 26 thereof to its normal size. In this position, the collar holds the depressor member against the flat portion 42 of the cam and that retains the lever member 17 in the released position until it is forceably moved.

With a hose 2 connected to the nipple 37 and the lever in released position the coupling is moved to align the tire stem end with the body opening 9. The body is then moved over the tire stem until the end portion thereof extends within the bore of the collar and normally, in that position the valve in the tire stem would be engaged by the projection 32. The lever is then swung to position the handle 39 generally parallel with the hose nipple 33, which movement causes the higher portion of the cam to force the depressor member 27 toward the collar 25 compressing same whereby the bore 26 is reduced and the collar sealingly engages the tire stem end portion 10. During this movement, the projection 32 should open the tire valve so that air can then be delivered through the stem to the tire to inflate same. When a desired pressure is obtained in the tire, the coupling is quickly released from the stem by swinging the handle 39 to the coupling release position whereby the coupling can be removed from the tire stem and the tire stem valve automatically close.

It is to be understood that while I have illustrated and described one form of my invention, it is not to be limited to the specific form or arrangement of parts herein described and shown.

What I claim and desire to secure by Letters Patent is:

1. A compression coupling between a supply member and an elongate tubular receiving member comprising:
    a. a one piece body member molded of synthetic resin and having a longitudinal bore opening at one end and a reduced aperture at the other end to receive an end portion of an elongate tubular receiving member extending therethrough into said bore, said body member having a shoulder between said aperture and bore, said body member having opposed substantially parallel walls at said one end with aligned opposed bearing recesses therein and another wall between said opposed walls with an elongate slot therein extending from said one end terminating in spaced relation to said shoulder;
b. a compressible sleeve normally fitting in said bore and having an end engaging said shoulder, said sleeve having a through bore normally of a size to movably receive said end portion of said tubular receiving member and contractable to sealingly engage same in response to longitudinal compression;
c. a depressor member molded of synthetic resin and slidably mounted in said bore and having one end engaging said sleeve whereby said sleeve is between said one of the depressor member and said shoulder, said depressor member having an elongate portion extending outwardly through said slot for connection with a supply member and a passage communicating same with the bore in said sleeve;
d. a one piece actuating member molded of synthetic resin and having a head with a lever extending therefrom and opposed integral bearing members extending laterally outwardly of said head into said bearing recesses in the opposed body walls to pivotally mount said actuating member, a cam member on said actuating member head engaging said depressor member in a released position and operable to move said depressor member longitudinally of said body bore to compress said sleeve in response to pivoting of said actuating member to a compressing position;
e. said opposed body walls having limited resiliency permitting outward spreading movement thereof for movement of said actuating member bearing members therebetween to alignment with the respective bearing recesses and then return to position said bearing members in said bearing recesses;
f. said bearing members having outer ends with portions bevelled inwardly therefrom forming inclined surfaces for engagement with the opposed body walls to facilitate outward spreading thereof in response to pressure on the actuating member moving same into said one end of the body bore.

2. A tire stem connector for use on air hoses in inflating pneumatic tires comprising:
a. a one piece body member molded of synthetic resin and having first and second ends with an end wall at the first end and connected opposed side walls extending therefrom defining a bore that is open at said second end, said end wall having an opening smaller than said bore with said end wall defining a shoulder therebetween, said opening being adapted for a tire stem to extend therethrough;
b. said body having spaced side walls adjacent said second end, said side walls being in opposed relation and substantially parallel to a respective opposed side wall, said body having aligned bearing openings in certain of said opposed side walls and an elongate slot in another side wall extending from said second end and terminating in spaced relation to said shoulder, said certain opposed side walls having a thickness and resiliency cooperating with said elongate slot to permit limited spreading apart of said certain opposed side walls;
c. a resilient collar normally fitting in said bore and engaging said side walls with one end engaging said shoulder, said collar having a bore axially of said opening in said end wall and of a size to normally permit a tire stem end to move therein and to contract for the collar to sealingly engage said tire stem end in response to a predetermined longitudinal compression of said collar;
d. a one piece depressor member molded of synthetic resin and slidable in said bore and having first and second ends with the first end engaging said collar, said depressor having a cavity extending therein from said first end and terminating in spaced relation to said second end, said depressor member having an elongate hose connector extending outwardly through said slot for sealed engagement with an air hose, said hose connector having a through bore communicating a hose with said cavity, said depressor member having an elongate axial projection extending from said cavity for engaging a valve stem in a tire stem positioned in said collar bore;
e. a one piece lever member molded of synthetic resin and having a head positioned in said body bore and an elongate handle on said head, said head having opposed integral trunnions thereon rotatably mounted in said opposed bearing openings, said lever member head having depressor engaging portions eccentric relative to the trunnion axis for movement of the depressor from a collar release position to a collar compressed and stem gripping position in response to movement of the lever handle through a predetermined arc;
f. said trunnions having end portions with inclined converging surfaces and a length relative to spacing of certain opposed side walls and the resiliency thereof that the inclined surfaces effect limited spreading of said side walls for movement of said trunnions therebetween to alignment with the opposed bearing openings with return of said opposed side walls to normal spacing positioning the trunnions in the respective bearing openings.

* * * * *